US010403030B2

(12) United States Patent
Murray

(10) Patent No.: US 10,403,030 B2
(45) Date of Patent: Sep. 3, 2019

(54) COMPUTING VOLUMES OF INTEREST FOR PHOTOGRAMMETRIC 3D RECONSTRUCTION

(71) Applicant: Microsoft Technology Licensing, LLC, Redmond, WA (US)

(72) Inventor: Justin Samuel Murray, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 15/688,644

(22) Filed: Aug. 28, 2017

(65) Prior Publication Data

US 2019/0066361 A1    Feb. 28, 2019

(51) Int. Cl.
*G06K 9/32* (2006.01)
*G06T 15/20* (2011.01)
(Continued)

(52) U.S. Cl.
CPC .......... *G06T 15/205* (2013.01); *G01C 11/025* (2013.01); *G06K 9/00208* (2013.01);
(Continued)

(58) Field of Classification Search
CPC ....... G06T 17/00; G06T 15/005; G06T 15/60; G06T 17/10; G06T 2207/20076; G06T 2219/2021; G06T 7/593; G06K 9/00671
See application file for complete search history.

(56) References Cited

U.S. PATENT DOCUMENTS

| 8,547,374 B1 | 10/2013 | Sadjadi et al. |
| 2014/0225887 A1* | 8/2014 | Aguirre-Valencia ..... G06T 3/40 345/419 |

(Continued)

FOREIGN PATENT DOCUMENTS

EP    2933778 A1    10/2015

OTHER PUBLICATIONS

Donghoon Kim and Rozenn Dahyot, "3D Head Reconstructing using Multi-camera Stream," 2009 13th Irish Machine Vision and Image Processing Conference, pp. 156-161 (Year: 2009).*

C. Baillard and A. Zisserman, "A plane-sweep strategy for the 3D reconstruction of buildings from multiple images," International Archives of Photogrammetry and Remote Sensing, vol. XXXIII, Supplement B4. Amsterdam 2000 (Year: 2000).*

(Continued)

*Primary Examiner* — Sing-Wai Wu
(74) *Attorney, Agent, or Firm* — Fountainhead Law Group

(57) ABSTRACT

Techniques for computing a volume of interest for photogrammetric 3D reconstruction are provided. According to one set of embodiments, a computer system can receive a plurality of observations of a scene captured by a camera operator via one or more cameras and, for each observation in the plurality of observations, determine a likelihood distribution function that outputs, for each point in 3D real coordinate space, a likelihood that the point was of interest to the camera operator in view of the observation. The computer system can further combine the likelihood distribution functions for the plurality of observations into an aggregate likelihood distribution function and can compute a volume of interest using the aggregate likelihood distribution function. The computer system can then perform a photogrammetric 3D reconstruction of the scene, where the photogrammetric 3D reconstruction is constrained to objects within the volume of interest.

20 Claims, 6 Drawing Sheets

(51) Int. Cl.
  *G01C 11/02* (2006.01)
  *G06K 9/00* (2006.01)
  *G06T 17/00* (2006.01)
  *G06T 7/55* (2017.01)
(52) U.S. Cl.
  CPC .............. *G06K 9/3233* (2013.01); *G06T 7/55* (2017.01); *G06T 17/00* (2013.01); *G06T 2200/04* (2013.01); *G06T 2200/08* (2013.01); *G06T 2207/10016* (2013.01); *G06T 2215/16* (2013.01)

(56) References Cited

U.S. PATENT DOCUMENTS

2015/0228114 A1    8/2015   Shapira et al.
2015/0287204 A1* 10/2015   Holz .................. G06K 9/00711
                                                       382/103

OTHER PUBLICATIONS

Hane, et al., "An overview of recent progress in volumetric semantic 3D reconstruction", In Proceedings of 23rd International Conference on Pattern Recognition, Dec. 4, 2016, 14 Pages.

Kim, Donghoon, "3D Object Reconstruction using Multiple Views", In the Thesis Submitted to the University of Dublin, Trinity College, in fulfillment of the requirements for the degree of Doctor of Philosophy, Sep. 2010, 178 Pages.

Newcombe, et al., "KinectFusion: Real-Time Dense Surface Mapping and Tracking", In Proceedings of the 10th IEEE International Symposium on Mixed and Augmented Reality, Oct. 26, 2011, 10 Pages.

"International Search Report and Written Opinion Isssued in PCT Application No. PCT/US2018/038387", dated Sep. 28, 2018, 14 Pages.

* cited by examiner

COMPUTING VOLUMES OF INTEREST FOR PHOTOGRAMMETRIC 3D RECONSTRUCTION

BACKGROUND

Photogrammetric 3D (three-dimensional) reconstruction is a computing technique that enables the automated creation of 3D models of real-world objects using information derived from 2D (two-dimensional) images of those objects. This technique is used in fields such as architectural design, video game development, visual effects production, virtual reality, augmented reality, and so on to generate 3D object models in a manner that is less time-consuming and potentially more precise than manual modeling.

In a conventional photogrammetric 3D reconstruction workflow, an individual (i.e., camera operator) first captures, using one or more cameras, a series of photographs or video frames of a target object or group of objects to be reconstructed with the goal of documenting all exterior surfaces of the target object(s). This process is sometimes referred to as "scanning" the target object(s). Once the scanning is complete, a reconstruction program takes the captured images as input, detects the objects that appear in the images, extracts 3D features of the detected objects, and generates 3D models of the objects based on the extracted features.

One issue with the conventional workflow described above is that, in many cases, the camera(s) used by the camera operator to scan the target object(s) will capture other objects and environmental details which the operator has no interest in reconstructing. For example, if the target object is a model car resting on a table, as part of the scanning process the camera(s) may also capture the table itself, chairs around the table, a wall clock behind the table, and so on. In this example, the camera operator does not want to reconstruct these other objects; he/she is only interested in the model car. However, because they appear in the captured images (perhaps on the image peripheries or in the background), the reconstruction program will nevertheless detect these other objects and create 3D models for them. This increases the amount of compute resources and time needed to carry out the reconstruction process and, in implementations where the precision of reconstruction is constrained according to the overall size of the space being reconstructed, can result in less detail on the 3D model of the target object.

SUMMARY

Techniques for computing a volume of interest for photogrammetric 3D reconstruction are provided. According to one set of embodiments, a computer system can receive a plurality of observations of a scene captured by a camera operator via one or more cameras and, for each observation in the plurality of observations, determine a likelihood distribution function that outputs, for each point in 3D real coordinate space, a likelihood that the point was of interest to the camera operator in view of the observation. The computer system can further combine the likelihood distribution functions for the plurality of observations into an aggregate likelihood distribution function and can compute a volume of interest using the aggregate likelihood distribution function. The computer system can then perform a photogrammetric 3D reconstruction of the scene, where the photogrammetric 3D reconstruction is constrained to objects within the volume of interest.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present disclosure provide techniques for efficiently computing a volume of interest within a scene based on observations of the scene that are captured via one or more cameras. This volume of interest corresponds to a spatial region in the scene that an operator of the one or more cameras was most likely looking at (i.e., focusing on) at the time of capturing the observations. In certain embodiments, the computed volume of interest can be used to constrain the processing that is performed by a photogrammetric 3D reconstruction program such that only objects within the volume of interest are reconstructed (i.e., modeled in 3D) by the program. This, in turn, can reduce the likelihood that the program will unnecessarily reconstruct portions of the scene that were not intended for reconstruction by the camera operator.

1. System Environment

Figure 1A:
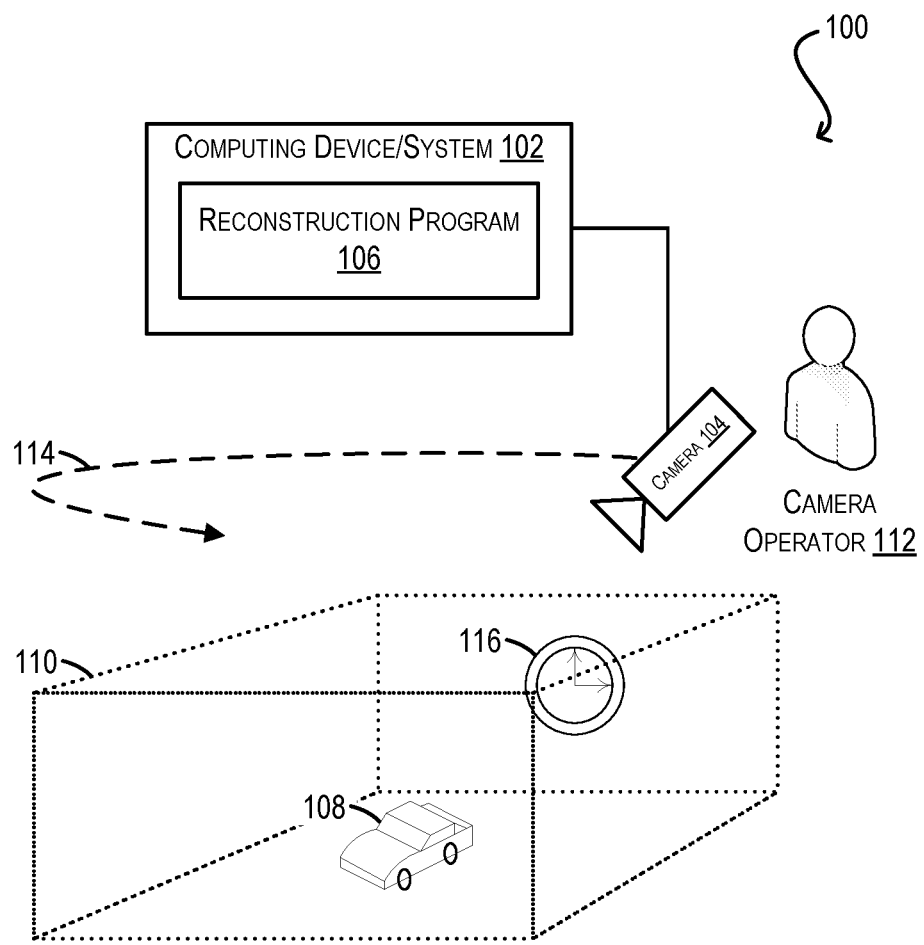
FIGS. 1A and 1B are simplified block diagrams of a system environment according to certain embodiments.

FIG. 1A is a simplified block diagram of a system environment 100 in which embodiments of the present disclosure may be implemented. As shown, system environment 100 includes a computing device/system 102 that is communicatively coupled with a camera 104. Computing device/system 102 may be, e.g., a desktop computer, a laptop computer, a server computer, a video game console, a mobile device (e.g., smartphone, tablet, etc.), a wearable device (e.g., smartwatch, smart glasses, etc.), or the like. Camera 104 may be, e.g., a monocular video or still camera, an infrared camera, or any other type of directed visual sensor known in the art.

In the example of FIG. 1A, computing device/system 102 is configured to carry out, using a reconstruction program 106, a photogrammetric 3D reconstruction of a target object 108 situated in a real-world place/setting (i.e., scene) 110. To that end, a camera operator 112 can move camera 104 in a path 114 around target object 108 and thereby capture, using camera 104, a series of 2D images (e.g., photographs or video frames) of the exterior surface of target object 108. The captured images can then be fed to reconstruction program 106, which can detect the objects that appear in the images (including target object 108), extract 3D features of the detected objects, and generate 3D models of the objects based on the extracted features.

As noted in the Background section, a common problem with this conventional reconstruction workflow is that, as part of scanning target object 108, camera operator 112 will often inadvertently capture other objects and/or environmental details (e.g., those in the vicinity of target object 108 or in the foreground/background) that operator 112 does not have any interest in reconstructing, but are nevertheless detected and modeled by reconstruction program 106. For instance, in FIG. 1A, such extraneous objects may include object 116. The modeling of these extraneous objects/details can slow down the overall reconstruction process and, in some cases, can undesirably result in less detail in the generated 3D model of target object 108.

Figure 1B:
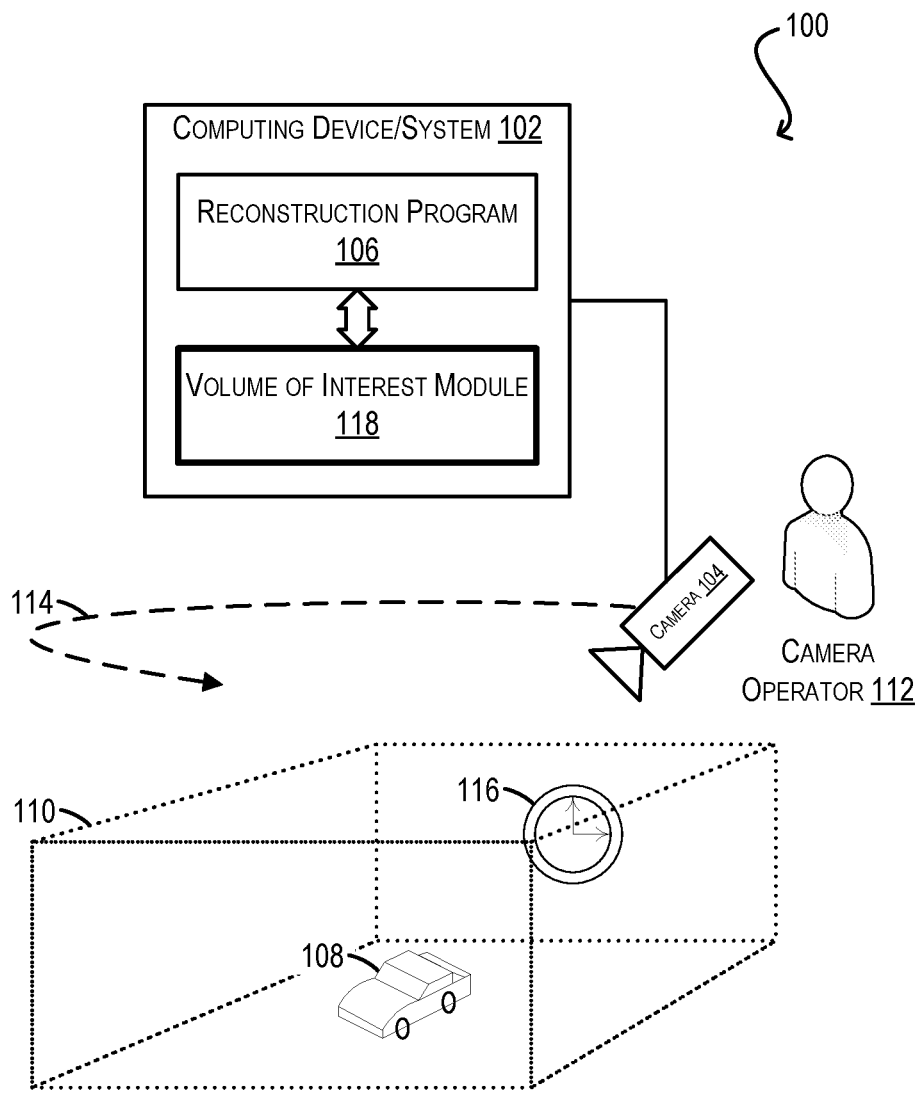

To address this and other similar issues, FIG. 1B depicts an enhanced version of computing device/system 102 that includes a "volume of interest" (VoI) module 118 communicatively coupled with reconstruction program 106. In one set of embodiments, VoI module 118 can be implemented in a library or middleware platform that is invoked by reconstruction program 106. In other embodiments, VoI module 118 can be incorporated into reconstruction program 106.

At a high level, VoI module 118 can compute, based on a set of camera observations derived from the images of scene 110 captured by operator 112 via camera 104, the region of space in scene 110 that operator 112 was most likely looking at/focused upon at the time of capturing the images (i.e., the "volume of interest" from the perspective of operator 112). As described in further detail below, VoI module 118 can perform this computation by (1) determining, for each camera observation, a likelihood distribution function which outputs a likelihood that a given input point was of interest to camera operator 112 in view of the observation; (2) combining the per-observation likelihood distribution functions into a single, aggregate likelihood distribution function which outputs a likelihood that a given input point was of interest to camera operator 112 in view of all of the observations; and (3) computing the volume of interest based on the aggregate likelihood distribution function (e.g., by applying the aggregate function to a plurality of sampled points in the scene). VoI module 118 can then provide the computed volume of interest to reconstruction program 106, which can constrain its reconstruction efforts to the objects within the volume of interest.

By implementing VoI module 118 as shown in FIG. 1B and as described above, a number of benefits can be realized. First, since reconstruction program 106 uses the computed volume of interest as a spatial constraint on its reconstruction processing, program 106 can avoid modeling object(s) that operator 112 likely did not intend to be reconstructed (i.e., objects outside of the volume of interest), and instead focus on modeling the object(s) that operator 112 likely did intend to be reconstructed (i.e., objects within the volume of interest). As a result, program 106 can perform its reconstruction task in a more efficient manner.

Second, since VoI module 118 performs its computation based solely on the images captured via camera 104 and does not require additional sensor data, dense depth observations, maintenance of large data structures, significant compute power, or stringent user behaviors, VoI module 118 is fairly lightweight and can be practically implemented on compute and/or memory-constrained devices (e.g., mobile devices such as smartphones).

Third, the per-observation likelihood distribution functions which are determined by VoI module 118 can be easily modified and tuned on an as-needed basis to make the computed volume of interest more loose-fitting/tight-fitting or exhibit a different shape (e.g., oblong, etc.). This enables VoI module 118 to support any number of different reconstruction use cases, scene environments, user behaviors, and so on. In certain embodiments, each likelihood distribution function can be determined using a set of heuristics that assume the camera operator's interest in a given point v falls off at different rates based on the distance and direction of point v from a central "point of maximal interest" which corresponds to the point of intersection of the camera's view ray and a near culling plane. These heuristics are described in further detail in section (2) below.

It should be appreciated that FIGS. 1A and 1B are illustrative and not intended to limit the embodiments of the present disclosure. For example, although these figures depict the use of a single camera 104 for scanning target object 108, in some embodiments multiple cameras may be used. In these cases, the combined outputs (i.e., captured images) of the multiple cameras may be provided to VoI module 118 and reconstruction program 106 for VoI computation and target object reconstruction.

Further, although camera 104 is shown as being separate from computing device/system 102, in some embodiments camera 104 may be integrated directly into the body/housing of computing device/system 102 (e.g., a smartphone camera).

Yet further, although FIG. 1B specifically contemplates a scenario where VoI module 120 is used for optimizing the photogrammetric 3D reconstruction task performed by reconstruction program 106, VoI module 120 may also be used for other applications that are not directed to such reconstruction. Generally speaking, VoI module 118 may be broadly leveraged to determine a volume of interest for any application in which is it helpful to know what region of space a camera operator is/was most interested in based on the camera observations captured by the operator.

2. VoI Module Workflow

Figure 2:
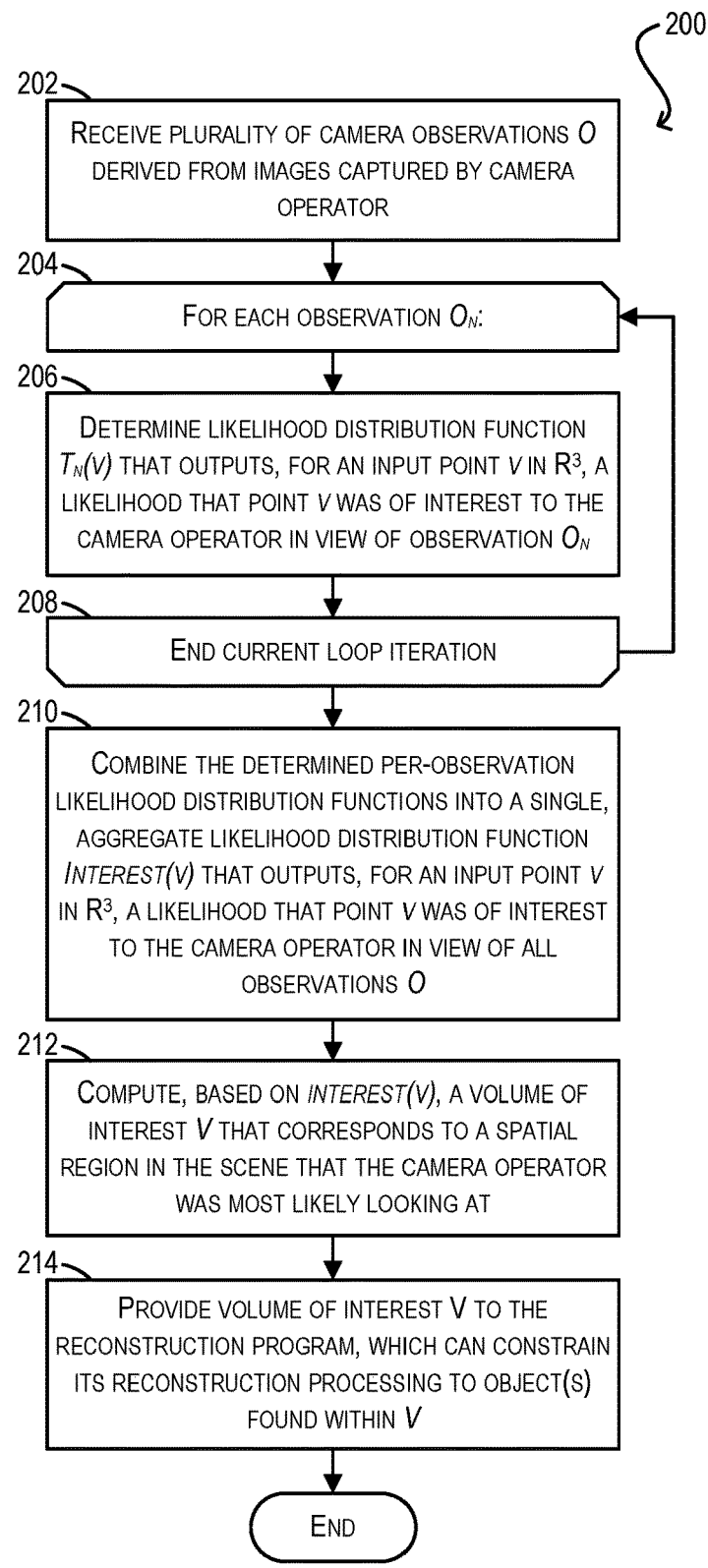
FIG. 2 depicts a high-level workflow for computing a volume of interest based on camera observations according to certain embodiments.

FIG. 2 depicts a workflow 200 that provides additional details regarding the processing executed by VoI module 118 of FIG. 1B for computing a volume of interest in scene 110 based on the images captured by camera operator 112 according to certain embodiments.

Starting with block 202, VoI module 118 can receive a plurality of observation data points, referred to as camera observations O, that are derived from the images (e.g., photographs or video frames) captured by camera operator 112 using camera 104. Each camera observation $O_n$ can be derived from a single captured image and can include (1) a position $c_n$ of the camera at the time the image was taken, (2) a view direction $d_n$ the camera was pointed in at the time the image was taken, (3) a near culling plane, and (4) a far culling plane. The near culling plane (or "near plane") can correspond to a plane in space that is perpendicular to the camera's view direction and that indicates the location of the nearest detected object in the image (i.e., the object nearest to $c_n$). The far culling plane (or "far plane") can correspond to a plane in space that is perpendicular to the camera's view direction and that indicates the location of the farthest detected object in the image (i.e., the object farthest from $c_n$).

In one set of embodiments, the derivation of observation parameters (1)-(4) from each captured image can be performed using known image processing techniques by an image pre-processor that is separate from VoI module 118. In cases where camera operator 112 captures a large number of images of scene 110 via camera 104 (e.g., a lengthy video sequence or group of video sequences), the image pre-processor may be configured to select a sparse subset of the captured images, such as certain key frames in the video(s), and derive the camera observations from the selected subset.

At block 204, VoI module 118 can enter a loop for each camera observation $O_n$ received at block 202. Within this loop, VoI module 118 can determine a likelihood distribution function $T_n(v)$ for camera observation O, that outputs, for a given input point v in 3D real coordinate space $R^3$, a likelihood that point v was of interest to camera operator 112 in view of $O_n$ (block 206). Stated another way, function $T_n(v)$ can define a three-dimensional "interest space" that indicates, based on the parameters of camera observation $O_n$, how interested camera operator 112 likely was in each 3D point in the space.

Generally speaking, VoI module 118 can use any type of likelihood distribution function that it deems appropriate for $T_n(v)$, as long as the function has an input domain of $R^3$ and an output codomain within R, bounded by well-defined upper and lower extrema. In certain embodiments, VoI module 118 can apply a set of heuristics to determine $T_n(v)$, where the set of heuristics comprise empirically-derived assumptions/considerations that provide guidance in defining a $T_n(v)$ that accurately models what camera operator 112 was focused on at the time of capturing camera observation $O_n$. An example set of such heuristics is provided below:
1. The point of maximal interest to the camera operator—in other words, the point in space that the camera operator was almost certainly looking at—is the intersection point between the view ray of camera observation $O_n$ (i.e., the ray extending from $c_n$ in the view direction $d_n$) and the near plane of $O_n$; this point of maximal interest is referred to as $\alpha$.
2. The camera operator's level of interest diminishes at a relatively fast rate when moving from $\alpha$ towards $c_n$, since the region of space in front of the near plane is likely empty space
3. The camera operator's level of interest diminishes at a relatively slower rate when moving from $\alpha$ towards the far plane (i.e., away from $c_n$), since the camera operator likely is interested to some degree in the space behind the near plane and in front of the far plane, but that interest deteriorates with distance from $\alpha$.
4. The camera operator's level of interest diminishes at a rate determined by the camera's field of view (FOV) when moving from $\alpha$ in any direction orthogonal to the view ray of $O_n$ (i.e., towards the observation image edges), since interest likely falls off when close to an edge Taken together, the foregoing heuristics can result in a "tear drop" shaped likelihood distribution function $T(v)$ that is defined as follows according to an embodiment:

$$T(v) = g(\|v - \alpha\|, \text{angle}(v - \alpha, \omega - \alpha)), \text{ where}$$ Listing 1

$$g(x, \theta) = e^{-2(f(\theta)x)^2}$$

$$f(\theta) = t(\theta)\left(\frac{1}{d_p} + \frac{9\theta}{d_p \pi}\right) + \frac{1 - t(\theta)}{d_o}$$

$$t(\theta) = \frac{|\theta - \frac{\pi}{2}|}{\frac{\pi}{2}}$$

$$d_p = \|\omega - v\|$$

$$d_o = \|\xi - \alpha\| = \|\alpha - c\|\tan\left(\frac{FOV}{2}\right)$$

Figure 3:
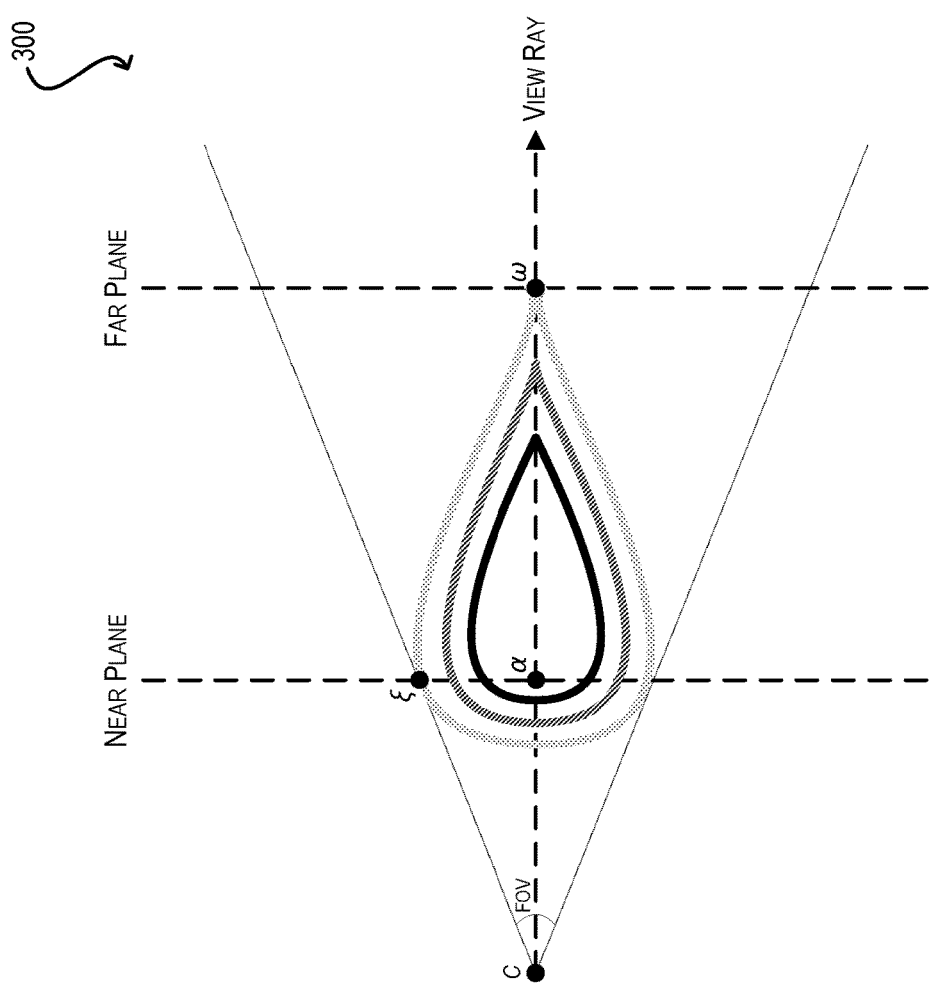
FIG. 3 depicts an example likelihood distribution function according to certain embodiments.

In the equations above, $\omega$ is the point of intersection between the view ray and the far plane of camera observation O and $\zeta$ is the point of intersection between the edge of the observation image and the near plane. In addition, $d_p$, $d_o$, and the constant 9 in $f(\theta)$ are tunable parameters that can be modified to change the depth and width of the function's tear drop shape. FIG. 3 provides an illustration 300 of this shape, with the solid lines indicating regions of the function that output a common interest likelihood (darker lines indicating regions of higher likelihoods, lighter lines indicating regions of lower likelihoods).

Once VoI module 118 has determined $T_n(v)$ for current camera observation $O_n$, the current loop iteration can end (block 208) and module 120 can repeat the loop for additional camera observations until all observations have been processed. Then, at block 210, VoI module 118 can combine all of the determined likelihood distribution functions into a single, aggregate likelihood distribution function Interest(v) that outputs, for a given input point v in $R^3$, a likelihood that point v was of interest to camera operator 112 in view of all camera observations O. Stated another way, function Interest(v) can define a continuous 3D interest space that indicates, based on all of the camera observations captured by camera operator 112, how interested operator 112 likely was in each 3D point in the space.

In one set of embodiments, the processing at block 210 can involve calculating a summation of the per-observation likelihood distribution functions $T(v)$ such that Interest$(v) = \sum_{k=1}^{m} T_k(v)$, where m is the total number of camera observations received at block 202. Further, since m is finite and each function $T_n(v)$ has a well-defined upper bound, in some embodiments Interest(v) can be normalized such that, for each input point v, it outputs an interest likelihood value within a predefined range (e.g., the range of 0 to 1).

Upon determining aggregate likelihood distribution function Interest(v), VoI module 118 can compute a volume of interest V based on Interest(v) that corresponds to the spatial region in scene 110 that camera operator 112 was most likely looking at in view of camera observations O (e.g., the spatial region where Interest(v) returns likelihood values greater than or equal to a predefined threshold likelihood) (block 212). There are a number of different ways in which this computation can be performed; for example, according to one approach, VoI module 118 can execute an iterative sampling algorithm that defines a bounding volume in scene 110, samples a number of points in the bounding volume, calculates interest likelihoods for the sampled points using Interest(v), modifies (e.g., shrinks) the bounding volume based on the calculated likelihoods, and repeats this process until a reasonable approximation of V is achieved. This iterative sampling algorithm is detailed in the next section.

According to another approach, VoI module 118 can use a 3D hulling algorithm to trace out the surface of V based on gradient cues. This approach can be employed if Interest(v) is a differentiable function. One of ordinary skill in the art will recognize other possible approaches and variations.

Finally, at block 214, VoI module 118 can provide the computed volume of interest to reconstruction program 106, which can constrain its photogrammetric 3D reconstruction process to solely reconstruct objects within the volume of interest. In this way, reconstruction program 106 can advantageously avoid reconstructing objects that are outside the volume of interest and thus were likely not intended for reconstruction by camera operator 112.

3. Volume of Interest Approximation Via Iterative Sampling

Figure 4:
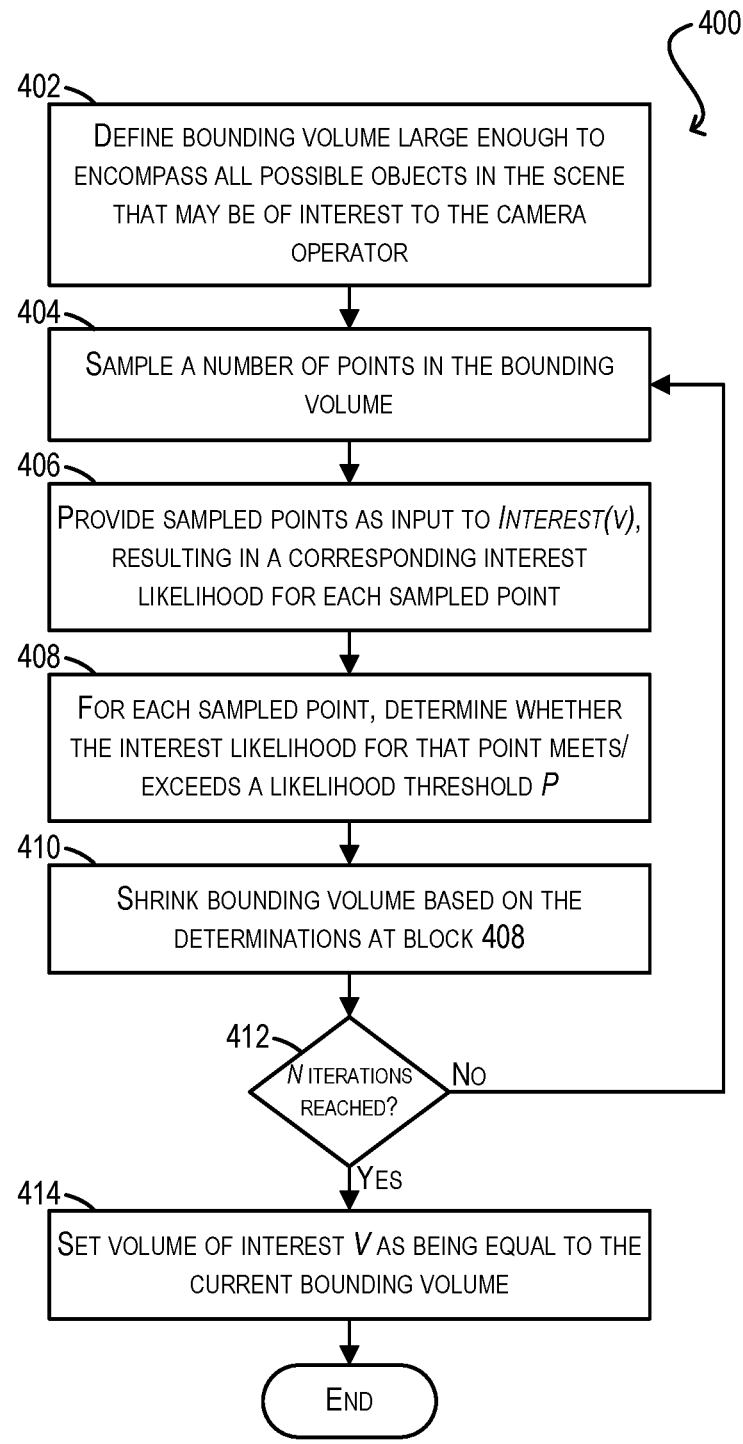
FIG. 4 depicts a workflow for approximating a volume of interest, given an aggregate likelihood distribution function, via iterative sampling according to certain embodiments.

As mentioned above, in certain embodiments VoI module 118 can use an iterative sampling algorithm to approximate volume of interest V based on aggregate likelihood distribution function Interest(v) (per block 212 of FIG. 2). FIG. 4 depicts an example workflow 400 of this algorithm.

Starting with block 402, VoI module 118 can a define an initial bounding volume that is large enough to encompass all possible objects is scene 110 that may be of interest to camera operator 112. The shape of this bounding volume can differ depending on various factors such as the nature of the reconstruction use case, the nature of scene 110, and so on. For example, the bounding volume may be a cube, a sphere, etc.

At blocks 404 and 406, VoI module 118 can sample a number of 3D points in the bounding volume and can pass the sampled points to Interest(v), resulting in corresponding interest likelihoods.

At block 408, for each sampled point, VoI module 118 can determine whether the interest likelihood for that point (as calculated by Interest(v)) meets or exceeds a predefined likelihood threshold P. VoI module 118 can then shrink the boundaries of the bounding volume based on the determinations made at block 408 (block 410). For example, if a particular sampled point s resulted in an interest likelihood value below threshold P at block 408, VoI module 120 can exclude point s from the newly shrunk bounding volume.

Upon shrinking the bounding volume, VoI module 118 can check whether a preconfigured number of iterations N has been reached (block 412). If not, VoI module 120 can return to block 404 to sample additional points in the bounding volume and to further shrink the volume if possible.

However, if N iterations are reached at block 412, VoI module 120 can conclude that the current bounding volume is a sufficiently accurate approximation of the actual volume of interest. As a result, VoI module 118 can set volume of interest V as being equal to the current bounding volume (block 414) and workflow 400 can end.

4. Example Computing Device/System

Figure 5:
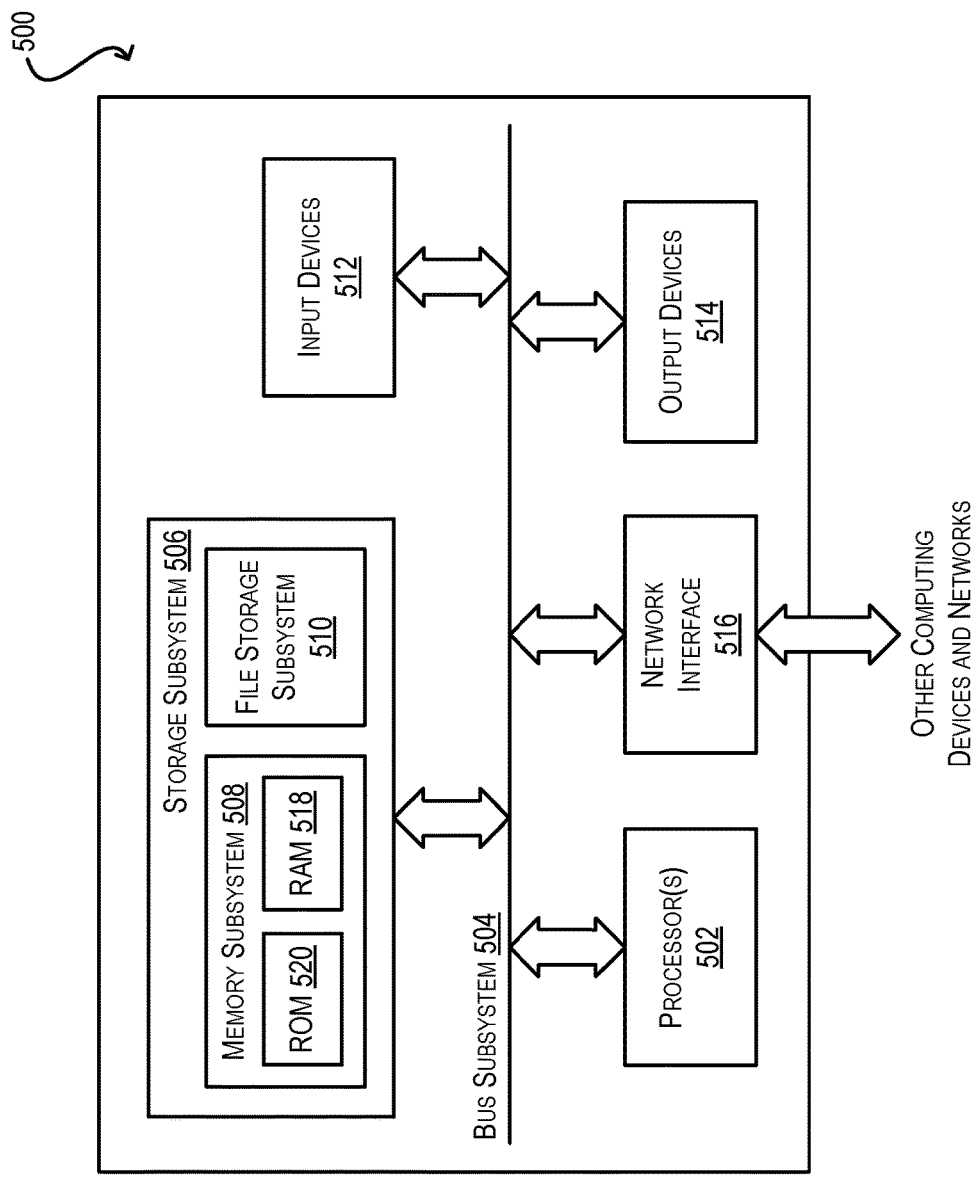
FIG. 5 is a simplified architectural diagram of an example computing device/system according to certain embodiments.

FIG. 5 is a simplified architectural diagram of an example computing device/system 500 according to certain embodiments. Computing device/system 500 can be used to implement device/system 102 of FIG. 1. As shown in FIG. 5, computing device/system 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computing device/system 500 communicate with each other as intended. Although bus subsystem 504 is shown schematically as a single bus, alternative embodiments of the bus subsystem can utilize multiple busses.

Network interface subsystem 516 can serve as an interface for communicating data between computing device/system 500 and other computer systems or networks. Embodiments of network interface subsystem 516 can include, e.g., an Ethernet card, a Wi-Fi and/or cellular adapter, a modem (telephone, satellite, cable, ISDN, etc.), digital subscriber line (DSL) units, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computing device/system 500.

User interface output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computing device/system 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device/system 500 is illustrative and other configurations having more or fewer components than device/system 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
receive a plurality of observations of a scene captured by a camera operator via one or more cameras;
for each observation in the plurality of observations, determine a likelihood distribution function that outputs, for each point in three-dimensional (3D) real coordinate space, a likelihood that the point was of interest to the camera operator in view of the observation, wherein the likelihood is based on a distance and a direction of the point from a point of maximal interest computed for the observation, the point of maximal interest corresponding to a point of intersection of a camera view direction associated with the observation and a near culling plane;

combine the likelihood distribution functions for the plurality of observations into an aggregate likelihood distribution function;

compute a volume of interest using the aggregate likelihood distribution function; and perform a photogrammetric 3D reconstruction of the scene, wherein the photogrammetric 3D reconstruction is constrained to objects within the volume of interest.

2. The computer system of claim 1 wherein each observation in the plurality of observations is derived from one or more two-dimensional (2D) images captured via the one or more cameras.

3. The computer system of claim 1 wherein the plurality of observations are derived from a subset of video frames captured via the one or more cameras.

4. The computer system of claim 1 wherein each observation in the plurality of observations include a camera position, the camera view direction, the near culling plane, and a far culling plane.

5. The computer system of claim 4 wherein the near culling plane is a plane in space perpendicular to the camera view direction that indicates a location of an object nearest to the camera position.

6. The computer system of claim 4 wherein the far culling plane is a plane in space perpendicular to the camera view direction that indicates a location of an object farthest from the camera position.

7. The computer system of claim 4 wherein the likelihood distribution function for each observation is determined based on a set of heuristics.

8. The computer system of claim 7 wherein the set of heuristics include a heuristic that the likelihood output by the likelihood distribution function should diminish relatively quickly when moving from the point of maximal interest towards the camera position of the observation.

9. The computer system of claim 7 wherein the set of heuristics include a heuristic that the likelihood output by the likelihood distribution function should diminish relatively slowly when moving from the point of maximal interest away from the camera position of the observation.

10. The computer system of claim 7 wherein the set of heuristics include a heuristic that the likelihood output by the likelihood distribution function should diminish at a rate that is determined by a field of view of a camera used to capture the observation.

11. The computer system of claim 1 wherein the likelihood distribution function determined for each observation exhibits a tear drop shape.

12. The computer system of claim 1 where the likelihood distribution function determined for each observation includes one or more tunable parameters for modifying a shape of the likelihood distribution function.

13. The computer system of claim 1 wherein the aggregate likelihood distribution function outputs, for each point in 3D real coordinate space, a likelihood that the point was of interest to the camera operator in view of all of the plurality of observations.

14. The computer system of claim 1 wherein the program code that causes the processor to combine the likelihood distribution functions for the plurality of observations into the aggregate likelihood distribution function further comprises code that causes the processor to perform a summation of the likelihood distribution functions.

15. The computer system of claim 1 wherein the program code further causes the processor to normalize the aggregate likelihood distribution function.

16. The computer system of claim 1 wherein the program code that causes the processor to compute the volume of interest using the aggregate likelihood distribution function further comprises code that causes the processor to:

define a bounding volume that is large enough to encompass all objects in the scene that may be of interest to the camera operator;

sample a plurality of points within the bounding volume;

calculate, for each sampled point, an interest likelihood by providing the sampled point as input to the aggregate likelihood distribution function; and shrink the bounding volume based on whether the calculated interest likelihoods meet or exceed a likelihood threshold.

17. The computer system of claim 16 wherein the processor is configured to repeat the steps of sampling the plurality of points within the bounding volume, calculating an interest likelihood for each sampled point, and shrinking the bounding volume until a predefined number of iterations has been reached.

18. The computer system of claim 1 wherein the program code that causes the processor to compute the volume of interest using the aggregate likelihood distribution function comprises program code that causes the processor to:

apply a 3D hulling algorithm to the aggregated likelihood distribution function and trace out a surface of the volume of interest based on gradient cues.

19. A method comprising:

receiving, by a computer system, a plurality of observations of a scene captured by a camera operator via one or more cameras;

for each observation in the plurality of observations, determining, by the computer system, a likelihood distribution function that outputs, for each point in three-dimensional (3D) real coordinate space, a likelihood that the point was of interest to the camera operator in view of the observation, wherein the likelihood is based on a distance and a direction of the point from a point of maximal interest computed for the observation, the point of maximal interest corresponding to a point of intersection of a camera view direction associated with the observation and a near culling plane;

combining, by the computer system, the likelihood distribution functions for the plurality of observations into an aggregate likelihood distribution function;

computing, by the computer system, a volume of interest using the aggregate likelihood distribution function; and performing, by the computer system, a photogrammetric 3D reconstruction of the scene, wherein the photogrammetric 3D reconstruction is constrained to objects within the volume of interest.

20. A computer readable storage medium having stored thereon program code executable by a computer system, the program code causing the computer system to:

receive a plurality of observations of a scene captured by a camera operator via one or more cameras;

for each observation in the plurality of observations, determine a likelihood distribution function that outputs, for each point in three-dimensional (3D) real coordinate space, a likelihood that the point was of interest to the camera operator in view of the observation wherein the likelihood is based on a distance and a direction of the point from a point of maximal interest computed for the observation, the point of maximal interest corresponding to a point of intersection of a camera view direction associated with the observation and a near culling plane;

combine the likelihood distribution functions for the plurality of observations into an aggregate likelihood distribution function;

compute a volume of interest using the aggregate likelihood distribution function; and perform a photogrammetric 3D reconstruction of the scene, wherein the photogrammetric 3D reconstruction is constrained to objects within the volume of interest.

\* \* \* \* \*